United States Patent
Malmborg et al.

(10) Patent No.: US 11,203,936 B2
(45) Date of Patent: Dec. 21, 2021

(54) AIRFOIL WITH BODY AND COVER PANEL

(71) Applicant: United Technologies Corporation, Farmington, CT (US)

(72) Inventors: Eric W. Malmborg, Amston, CT (US); Larry Foster, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 288 days.

(21) Appl. No.: 16/251,537

(22) Filed: Jan. 18, 2019

(65) Prior Publication Data

US 2020/0232329 A1 Jul. 23, 2020

(51) Int. Cl.

| F01D 5/14 | (2006.01) |
|---|---|
| F16B 5/06 | (2006.01) |
| F16B 13/02 | (2006.01) |
| F16B 13/00 | (2006.01) |

(52) U.S. Cl.
CPC .......... *F01D 5/147* (2013.01); *F05D 2230/64* (2013.01); *F05D 2240/301* (2013.01); *F05D 2250/33* (2013.01); *F05D 2260/31* (2013.01); *F05D 2300/603* (2013.01); *F16B 5/0657* (2013.01); *F16B 13/02* (2013.01); *F16B 2013/007* (2013.01)

(58) Field of Classification Search
CPC ................. F05D 5/147; F05D 2230/64; F05D 2240/301; F05D 2250/33; F05D 2260/31; F05D 2300/603; F01D 5/14; F01D 5/147; F01D 5/184; F01D 5/18; F16B 5/0657; F16B 13/02; F16B 2013/007
See application file for complete search history.

(56) References Cited

U.S. PATENT DOCUMENTS

| 5,074,752 | A | 12/1991 | Murphy et al. | |
|---|---|---|---|---|
| 9,359,901 | B2 | 6/2016 | Evans et al. | |
| 10,934,850 | B2 * | 3/2021 | Garner | F01D 5/187 |
| 2005/0254942 | A1 | 11/2005 | Morrison et al. | |
| 2013/0039774 | A1 * | 2/2013 | Viens | F01D 5/282 416/226 |
| 2013/0108470 | A1 * | 5/2013 | Weisse | F01D 5/16 416/97 R |
| 2014/0050589 | A1 * | 2/2014 | Viens | F01D 5/16 416/226 |
| 2015/0354375 | A1 * | 12/2015 | McComb | F01D 5/147 60/805 |
| 2017/0343007 | A1 * | 11/2017 | Murdock | F01D 5/147 |

(Continued)

FOREIGN PATENT DOCUMENTS

EP 22439219 10/2010

OTHER PUBLICATIONS

European Search Report for European Patent Application No. 20152749.6 completed Apr. 29, 2020.

*Primary Examiner* — Aaron R Eastman
(74) *Attorney, Agent, or Firm* — Carlson, Gaskey & Olds, P.C.

(57) ABSTRACT

An airfoil includes a body that has rib nodes that each define a node cavity therein. A cover panel is carried on the body over the rib nodes. The cover panel includes tabs that project into the node cavities. Plugs are disposed in the node cavities and pinch the tabs against the node cavities to lock the cover panel on the body.

16 Claims, 5 Drawing Sheets

(56) References Cited

U.S. PATENT DOCUMENTS

2018/0038386 A1    2/2018  Foster et al.
2018/0135421 A1    5/2018  Propheter-Hinckley
2020/0300093 A1*   9/2020  Drescher ................. B23P 15/04

* cited by examiner

AIRFOIL WITH BODY AND COVER PANEL

BACKGROUND

Airfoils, and particularly fan blades, may be made from multiple pieces in order to reduce weight and ease manufacturing. As an example, a hollow blade may be formed by securing two airfoil shell pieces together to provide an aerodynamic blade shape. An adhesive is used to bond the pieces together. A challenge, however, is that a relatively large amount of surface area is needed to strongly bond the pieces together and provide structural strength to the airfoil. This results in the use of thick interfacial ribs that add weight, thereby undermining the ultimate goal.

SUMMARY

An airfoil according to an example of the present disclosure includes a body that has rib nodes that define a node cavity therein, and a cover panel carried on the body over the rib nodes. The cover panel has tabs that project into the node cavities. Plugs are disposed in the node cavities and pinch the tabs against the node cavities, locking the cover panel on the body.

In a further embodiment of any of the foregoing embodiments, each of the plugs includes an exposed surface that is flush with the cover panel.

In a further embodiment of any of the foregoing embodiments, each of the rib nodes includes an undercut.

In a further embodiment of any of the foregoing embodiments, the cover panel includes a plurality of the tabs in each of the node cavities.

In a further embodiment of any of the foregoing embodiments, the tabs are flaps bent from the cover panel.

In a further embodiment of any of the foregoing embodiments, the cover panel is a fiber-reinforced polymer composite, and the body is metal.

In a further embodiment of any of the foregoing embodiments, each of the node cavities is symmetric.

In a further embodiment of any of the foregoing embodiments, each of the node cavities is round.

In a further embodiment of any of the foregoing embodiments, the plugs are polymer-based.

In a further embodiment of any of the foregoing embodiments, the plugs are fiber-reinforced polymer composite.

In a further embodiment of any of the foregoing embodiments, each of the plugs includes an exposed surface that is flush with the cover panel. Each of the rib nodes includes an undercut. The cover panel includes a plurality of the tabs in each of the node cavities, and the tabs are folds bent from the cover panel.

An airfoil according to an example of the present disclosure includes a metal body, a cover panel carried on the metal body, and push fasteners that extend through the cover panel and lock the cover panel on the metal body.

In a further embodiment of any of the foregoing embodiments, each of the push fasteners includes flexible barbs.

In a further embodiment of any of the foregoing embodiments, each of the push fasteners includes a head that is embedded in the cover panel.

In a further embodiment of any of the foregoing embodiments, the cover panel includes stitching adjacent the head of the push fasteners.

In a further embodiment of any of the foregoing embodiments, the metal body includes holes receiving the push fasteners, and the holes include undercuts.

In a further embodiment of any of the foregoing embodiments, the metal body includes straight holes receiving the push fasteners.

A gas turbine engine according to an example of the present disclosure includes a fan, a compressor section, a combustor in fluid communication with the compressor section, and a turbine section in fluid communication with the combustor. The fan has airfoils according to any of the foregoing examples.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
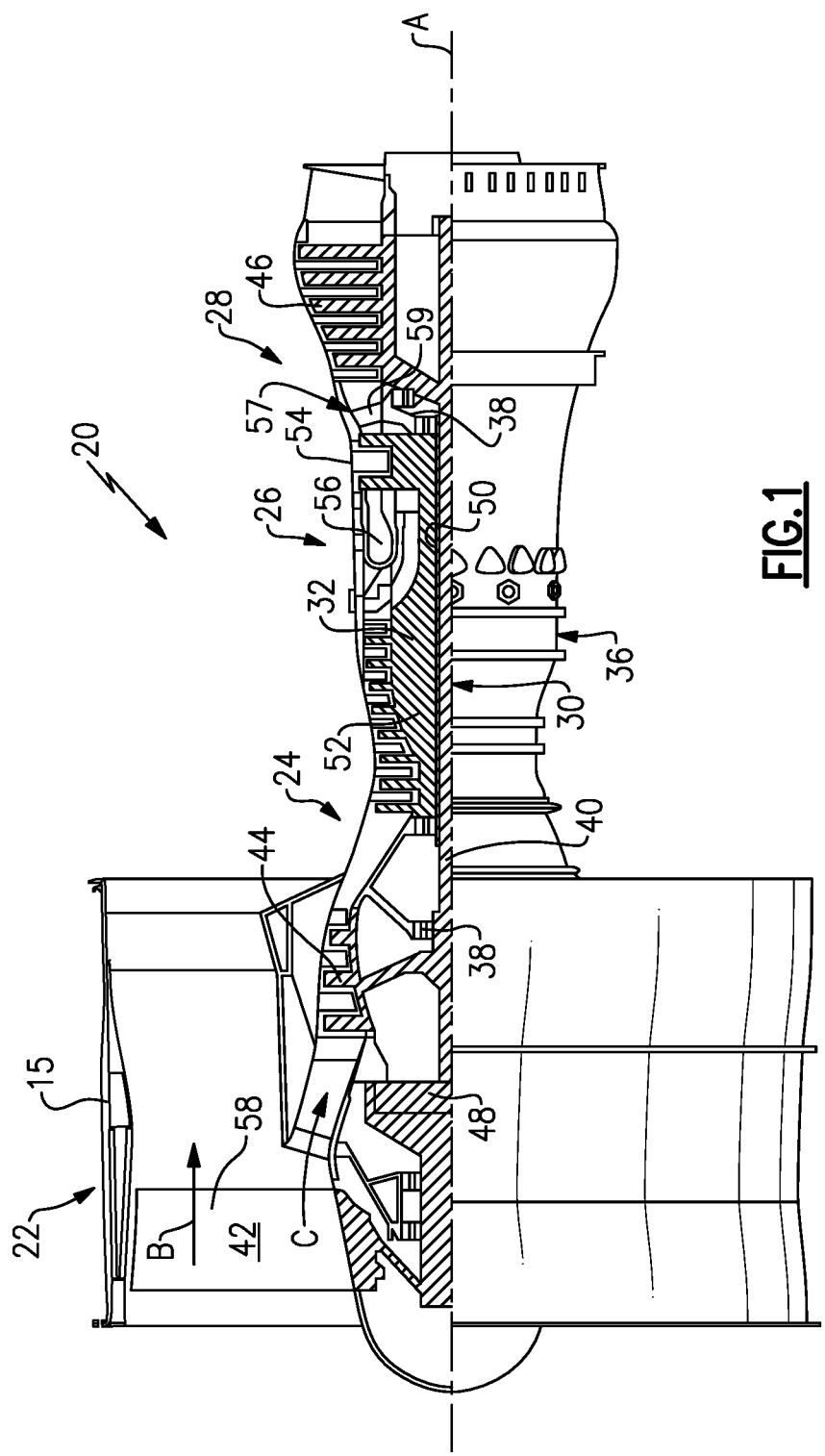
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
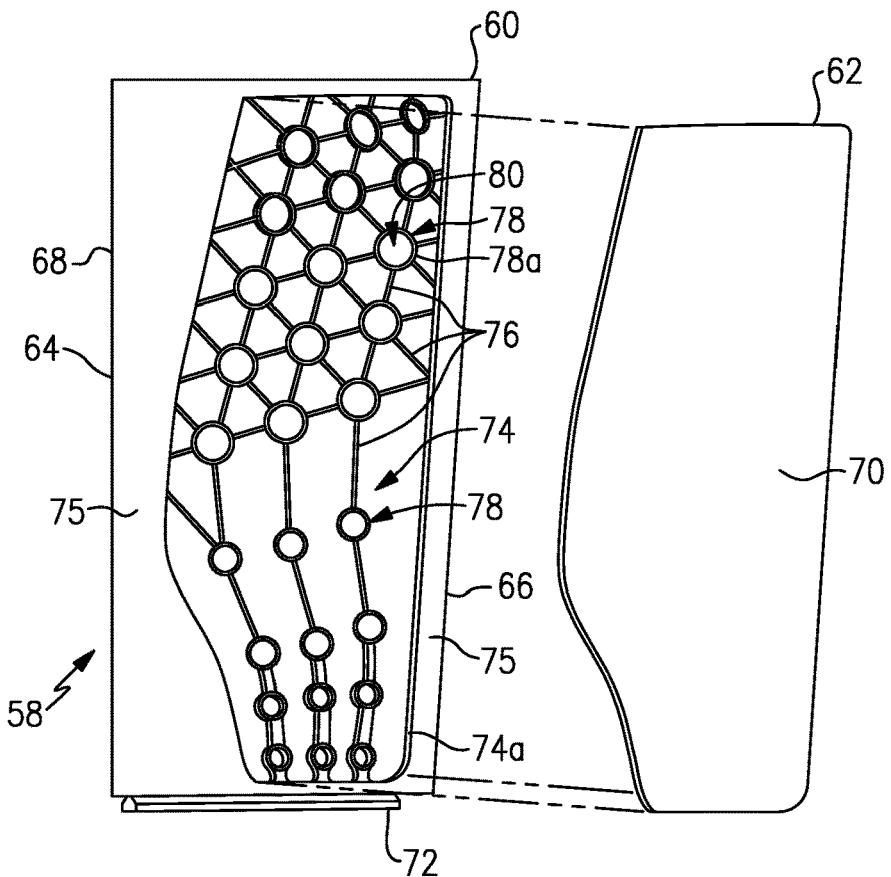
FIG. 2 illustrates an example airfoil of the gas turbine engine.

FIG. 2 illustrates an airfoil 58, which in this example is a rotatable blade of the fan 42 (see FIG. 1) of engine 20. It is to be appreciated that, although examples herein may be described with reference to a fan blade, this disclosure may also be applicable to static fan vanes or even other types of blades, vanes, or airfoils. As will be appreciated from the description that follows, the airfoil 58 utilizes an attachment scheme that provides strong securement of the various pieces, as well as facilitating weight-reduction and structural integrity.

The airfoil 58 generally has two pieces, including a body 60 and a cover panel 62, although the body 60, the cover panel 62, or both could alternatively be provided in multiple sub-pieces. As shown, the cover panel 62 is separated from the body 60 to reveal the configuration of the body 60; however, dashed lines are used to indicate the final, attached position of the cover panel 62 on the body 60. Together, the body 60 and the cover panel 62 delimit an airfoil profile that includes a leading edge 64, a trailing edge 66, a pressure side 68, and a suction side 70. In this example, the airfoil 58 also includes a root 72, which has a dovetail shape for securing the airfoil 58 in a doveslot of a rotor hub. In this example, the body 60 defines the leading and trailing edges 64/66, the pressure side 68, and the root 72. The cover panel 62 thereby provides the suction side 70 of the airfoil 58.

The airfoil 58 is a hybrid of different materials. For example, the body 60 is formed wholly or primarily of a metal alloy, such as a titanium alloy, and the cover panel 62 is formed of a polymer-based composite, such as a fiber-reinforced polymer matrix composite. The metal alloy of the body 60 provides good strength and wear/erosion resistance, while the polymer-based composite serves to reduce weight.

The fiber-reinforced polymer matrix composite is not particularly limited but may include one or more layers of fibers disposed in a polymer matrix, for example. Example fibers may include carbon or glass fibers, and example polymers may include thermoset or thermoplastic polymers. In one example, the polymer is epoxy. The fibers may be continuous or discontinuous. If continuous, the fibers may be provided as a unidirectional tape, two-dimensional woven fabric, three-dimensional woven fabric, biaxial or triaxial braided fabric, or other fiber configuration. The cover panel 62 may also include a single layer of fiber-reinforced polymer matrix composite or multiple layers, which may be the same or different with regard to the any or all of the fiber architecture, fiber composition, polymer composition, and volumetric amounts of fibers and polymer.

Figure 3:
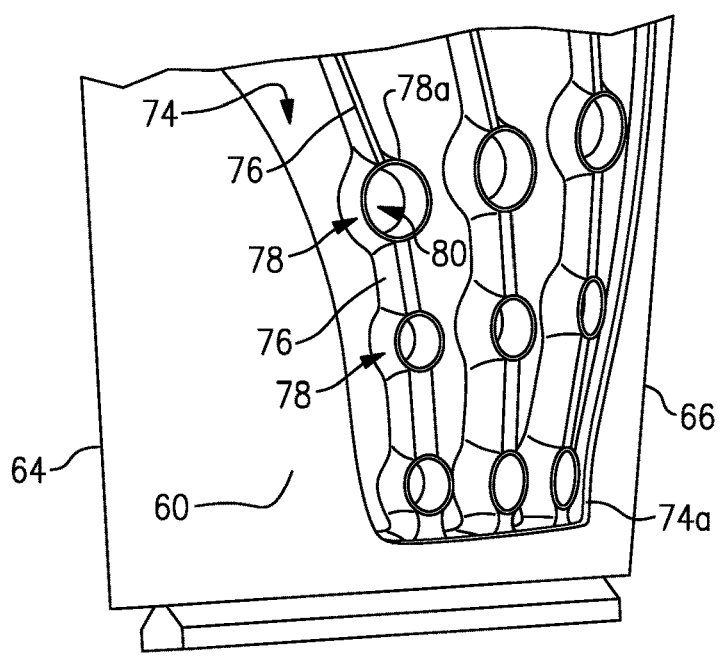
FIG. 3 illustrates a magnified view of a portion of the airfoil of FIG. 2.

Referring to the magnified view of the body 60 in FIG. 3, opposite the pressure side 68 the body 60 includes a recess 74 over which the cover panel 62 is attached, such that the airfoil 58 is at least partially hollow. The recess 74 is setback and flanked by exterior aerodynamic surfaces 75. The recess 74 may define a perimeter ledge 74a upon which the cover panel 62 sits. The cover panel 62, in its final installed position, is flush with the surfaces 75. The body includes ribs 76 in the recess 74. In this example, the ribs 76 extend primarily longitudinally with respect to inner and outer ends of the airfoil 58. The ribs 76 serve to provide structural reinforcement to the airfoil 58 (particularly in the longitudinal pull-direction of the airfoil 58), as well as support the cover panel 62.

The ribs 76 intersect at rib nodes 78. In this example, the rib nodes 78 are configured in an array of longitudinal rows. Each rib node 78 is formed of a rib wall 78a that defines or circumscribes a node cavity 80. In this example, the rib walls 78a, and thus the node cavities 80, are round. As will be appreciated, the rib walls 78a and node cavities 80 could alternatively be oval or other enclosed shape. Most typically, however, for reasons that will become apparent below, the node walls 78a and node cavities 80 have a shape that is free of sharp or distinct corners. If the ribs 76 are not needed for reinforcement, some or all of the ribs 76 may be excluded, leaving the nodes 78 as free-standing structures formed of the rib walls 78a.

Figure 4:
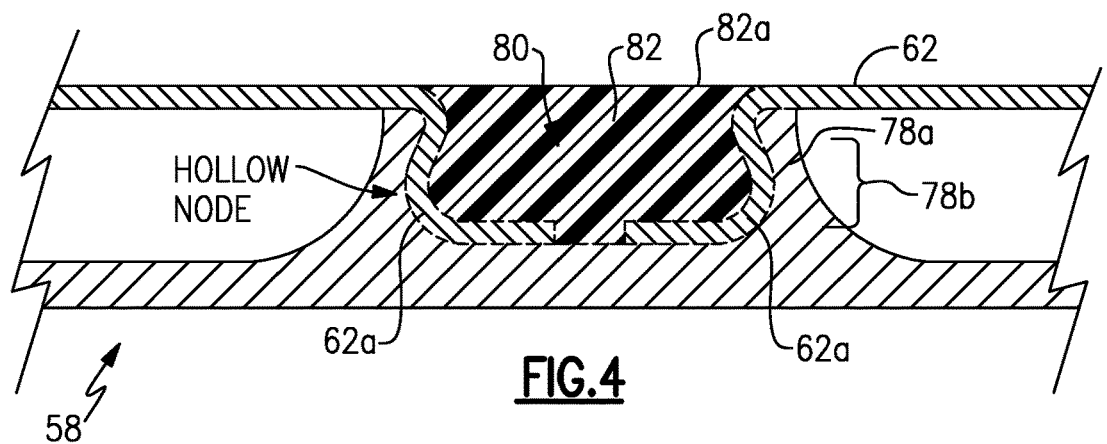
FIG. 4 illustrates a sectioned view of a representative portion of the airfoil.
Figure 5:
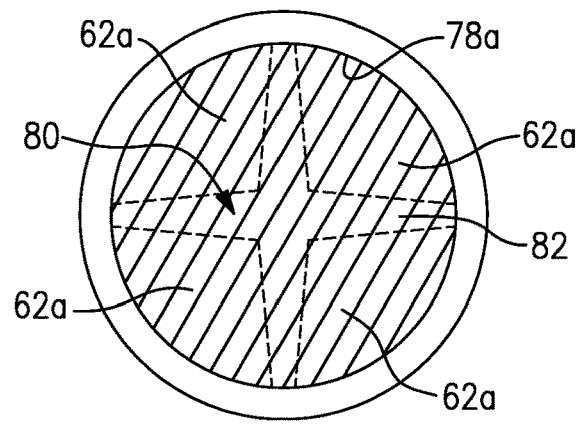
FIG. 5 illustrates a top-down view of a representative portion of the airfoil.

FIG. 4 illustrates a sectioned view through a representative portion of the airfoil 58, and FIG. 5 illustrates a top-down view of a representative portion of the airfoil 58. The cover panel 62 includes tabs 62a that project into the node cavity 80. A plug 82 is disposed in the node cavity 80. The plug 82 pinches the tabs 62a against the rib walls 78a of the node cavity 80, thereby locking the cover panel 62 on the body 60. In this regard, the relatively continuous and smooth profile of the node cavity 80 facilitates good contact and pressure distribution between the plug 82 and the tabs 62a.

To further facilitate mechanical locking, the rib wall 78a that forms the rib node 78 may include an undercut 78b. The plug 82 may pinch the tabs 62a into the undercut 78b and thereby partially wrap the tabs 62a around the rib wall 78a to prevent the tabs 62a from easily lifting out of the node cavity 80.

Figure 6:
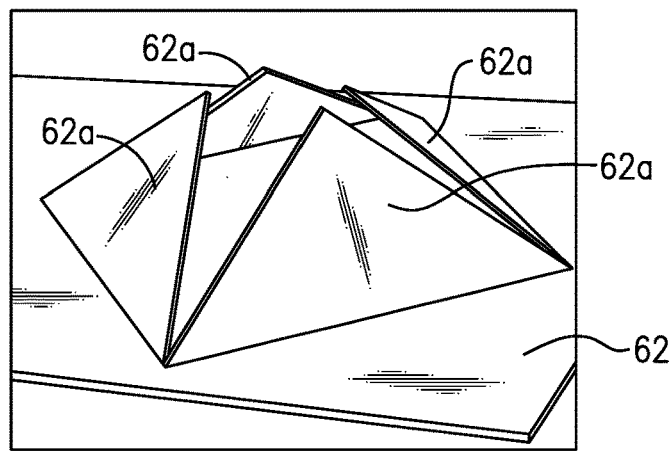
FIG. 6 illustrates a view of flaps cut into an uncured cover panel.

As an example, as shown in an isolated view in FIG. 6, the tabs 62a may be flaps that are cut from the cover panel 62. For instance, prior to fully curing the cover panel 62 during fabrication, the cover panel 62 may be cut in a cross pattern to form the flaps. The flaps may then be bent out-of-plane from the remainder of the cover panel 62 so that the flaps can extend into the node cavity 80. As will be appreciated, other patterns could be used to produce other flap shapes.

The flaps may additionally be trimmed, to reduce the number of flaps and/or reduce size and weight. However, the flaps should at least be of a size that provides ample area for contact with the plug 82. For instance, in the example shown in FIG. 4, the tabs 62a extend down the sides of the rib walls 78a and partially across the bottom of the rib cavity 80. Alternatively, the tabs 62a may be trimmed so as to extend only down to the bottom, or just short of the bottom, of the rib cavity 80. Should the tabs 62a be too small, for example as to extend only less than 50% the distance down the rib walls 78a to the bottom, the area for contact with the plug 82 may be insufficient to effectively pinch and secure the tabs 62a.

The bending of the flaps may be conducted prior to positioning the cover panel 62 on the body 60 or after such positioning. Once positioned, with the tabs 62a in the node cavity 80, the plug 82 is inserted into the node cavity 80. As an example, the plug 82 is initially a liquid or formable semi-solid that is introduced, such as by injection or pressing, into the node cavity 80. The liquid or formable semi-solid subsequently solidifies to form the final plug 82. The plug 82 traps the tabs 62a against the rib walls 78a, to thereby fasten the cover panel 62 to the body 60.

As will be appreciated, the plug 82 has an exposed (aerodynamic) surface 82a (FIG. 4) on the exterior of the airfoil 58. The exposed surface 82a is flush with the cover panel 62 so as to form a relatively smooth and continuous aerodynamic surface. If, after fabrication, the plug 82 is not flush, the plug 82 may be machined, sanded, or otherwise smoothed so that it is flush.

The material of the plug 82 may be co-processed with the cover panel 62. For example, the plug 82 and the cover panel 62 may be formed from the same composition of material or at least a common base polymer such that curing steps can overlap or be conducted simultaneously. In this regard, the plug 82 and the cover panel 62 may, in one example, be formed of epoxy or other thermoset polymer. Most typically, the selected polymer will be of relatively high strength and rigidity, rather than an elastomeric. Use of the same composition of material or at least of a common base polymer may also enhance adhesion bonding between the plug 82 and the cover panel 62, thereby facilitating locking the plug 82 in place. Alternatively, the plug 82 may be formed of a different composition than the cover panel 62 or at least a different base polymer. For instance, the plug 82 may be formed of a thermoplastic base-polymer that can be melted and injected into the node cavity 80.

The material of the plug 82 may also contain reinforcement or fillers in order to modify the properties for enhanced pinching of the tabs 62a. As an example, the material of the plug 82 may contain chopped fibers, such as short glass fibers, to increase strength and rigidity to facilitate trapping the tabs 62a.

The cover panel 62 may be fully or partially pre-fabricated prior to installation on the body 60 or partially or fully formed in place on the body 60. Pre-fabrication may include fully or partially curing the cover panel 62 and plug 82 prior to installation on the body 60, or fully or partially forming the cover panel 62 and plug 82 if formed of thermoplastic. If the cover panel 62 is formed from thermoplastic, it can be heated and re-shaped locally to conform to the body 62 and rib nodes 78. Local thermal forming is not possible if the cover panel 62 is formed from thermoset and is fully cured. If the cover panel 62 is cured/consolidated in situ on the body 60 during assembly, rigid or semi-rigid members may be provided in the recess 74 to support the cover panel 62 prior to and during the curing. One example of such members include foam inserts.

Figure 7:
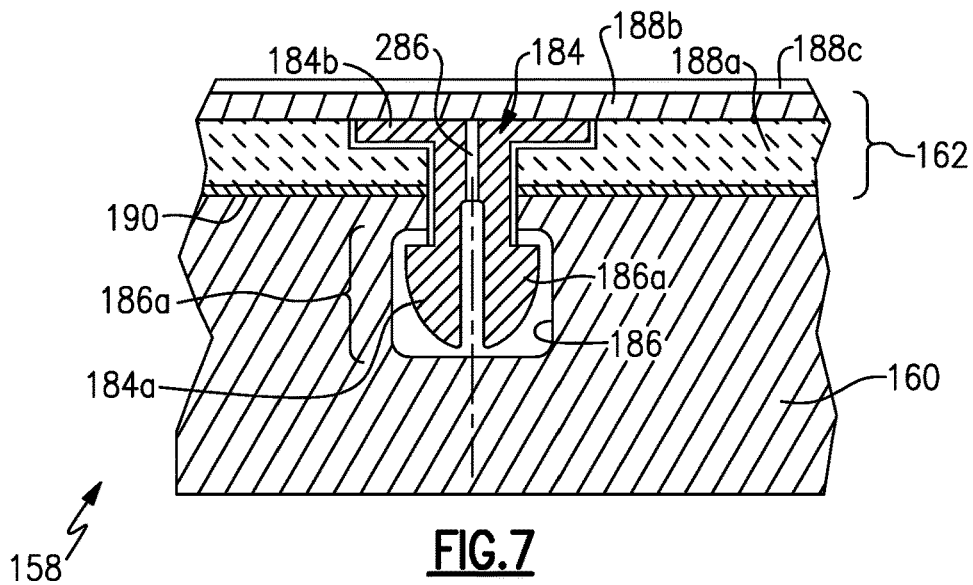
FIG. 7 illustrates an airfoil with a push fastener.

FIG. 7 illustrates a representative portion of another example airfoil 158 that also includes a body 160 and a cover panel 162. In this disclosure, like reference numerals designate like elements where appropriate and reference numerals with the addition of one-hundred or multiples thereof designate modified elements that are understood to incorporate the same features and benefits of the corresponding elements. The body 160 and cover panel 162 may generally have the same shape as shown in FIG. 1. However, rather than the rib nodes 78 and plug 82, the airfoil 158 employs push fasteners 184 (one shown). The push fasteners 184 may be used in the locations where the rib nodes 78 are shown in FIG. 1. The push fasteners 184 extend through the cover panel 162 and lock the cover panel 162 on the body 160.

In this regard, the body 160 is configured with holes 186 that receive and lock the push fasteners 184. For instance, the holes 186 may be defined in ribs of the body 160. As an example, the holes 186 may be used in the same or similar locations as the nodes 78 of the prior examples. In the example illustrated in FIG. 7, the push fastener 184 is configured as a cantilever snap-fit with one or more flexible barbs 184a that extend from a head 184b. Upon insertion into the hole 186, the barbs 184a initially compress inwards to fit through the narrow portion of the hole 186. The hole includes an undercut 186a, and upon reaching the undercut 186a during insertion the barbs 184a decompress and release outwards. The release cause the barbs 184a to engage the upper edge of the undercut, thereby preventing the snap-fit fastener 184 from retracting from the hole 186. The head 184b is engaged with the cover panel 162 and thereby fastens the cover panel 162 to the body 160.

In this example, the head 184b is embedded in the cover panel 162. For instance, the cover panel 162 is formed of multiple layers, and the head 184b is buried among the layers. The head 184b, therefore, is not exposed on the exterior surface of the cover panel 162. In a further example, the multiple layers of the cover panel 162 include one or more fiber-reinforced layers, such as layers 188a/188b, and a surface film layer 188c. For instance, the layers 188a/188b may be formed of the fiber-reinforced polymer composite described above. In one example, the fiber structure of one or both of the layers 188a/188b is selected to approximate an isotropic material, to facilitate mechanical and thermal compatibility with the body 160. For instance, the layers 188a/188b each include a 0/+60/−60 triaxial braid, which provides the cover panel 162 with in-plane quasi-isotropic properties. In a further example, the fibers in the triaxial braid are glass fibers, which provides a coefficient of thermal expansion that closely matches the coefficient of thermal expansion of a titanium body 60.

The surface film layer 188c serves to enhance resistance to wear/erosion. For instance, the surface film layer 188c may be formed of an elastomer, such as a fluoroelastomer.

As also shown in FIG. 7, an adhesive layer 190 may optionally be used between the cover panel 162 and the body 160. For instance, the adhesive layer 190 may be provided on a perimeter ledge of the body 160, similar to the perimeter edge 74a shown in FIG. 3. The adhesive layer 190 may be, but is not limited to, epoxy. Although the push fasteners 184 secure the cover panel 162 on the body 160, the adhesive layer 190 may be used to further facilitate securement and/or reduce play between the cover panel 162 and the body 160.

Figure 8:
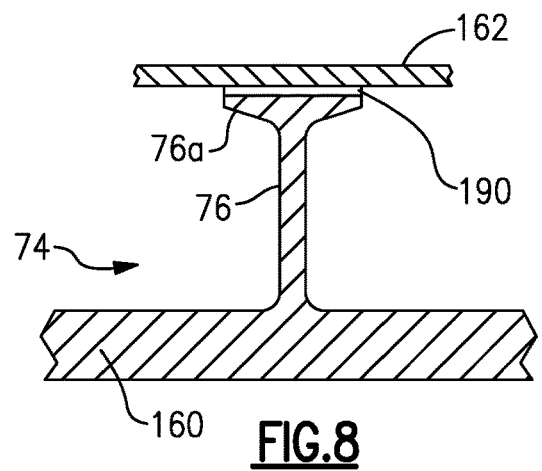
FIG. 8 illustrates a rib that includes a flange and an adhesive layer.

In a further example shown in FIG. 8, the ribs 76 may include a flange 76a upon which the cover panel 162 sits. The adhesive layer 190 may be situated on the flange 76a. The adhesive layer 190 on the flange 76a may be used to increase the surface bonding area in addition to adhesive on the perimeter ledge. The flange 76a thereby provides additional surface area for the purpose of bonding, yet minimizes mass of the body 162 in comparison to a solid body or thicker ribs.

Figure 9:
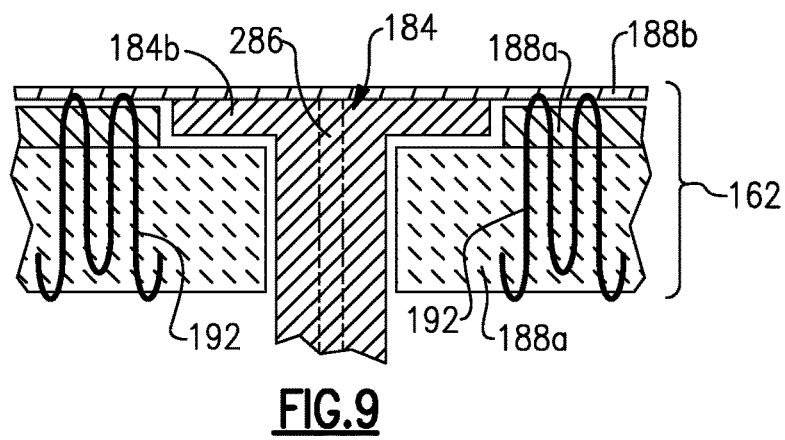
FIG. 9 illustrates an airfoil with a push fastener and stitching.

FIG. 9 illustrates a further example in which the cover panel 162 includes stitching 192 adjacent the head 184b of the push fastener 184. The stitching reinforces the cover panel 162 and facilitates reduction in delamination between the layers 188a/188b, particularly during an impact. As an example, the stitching 192 may be formed of fibers of aramid, carbon, glass, or polyethylene, but is not limited thereto.

Figure 10:
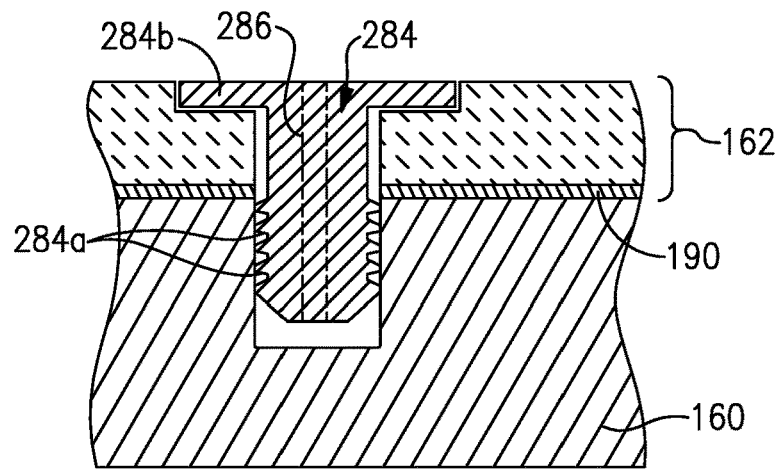
FIG. 10 illustrates an airfoil with a push fastener and straight hole.

FIG. 10 illustrates another example of a push fastener 284. In this example, the push fastener 284 includes radial flexible barbs 284a and the body 160 includes a straight hole 286. The barbs 284a are carried on a shank that extends from the head 284b. The barbs 284a is received into the straight hole 286 to secure the cover panel 162 to the body 160. Upon insertion of the barbs 284a into the hole 286, the barbs 284a are compressed and deflect or deform. The barbs 284a tend to decompress and thus press outwards on the hole 286 to hold the fastener 284, and thus the cover panel 162, in place.

In a further example, the push fastener 184/284 may be installed "wet" with a paste adhesive to further bond and strengthen the attachment of the cover panel 162 to the body 160. In this regard, the push fasteners 184/284 may include one or more internal channels, depicted at 286 (FIGS. 7, 9, and 10) to permit injection of the adhesive paste through the head of the fasteners 184/284 and into the hole 186/286 to bond the fasteners 184/284 to the sides of the hole 186/286.

Figure 11A:
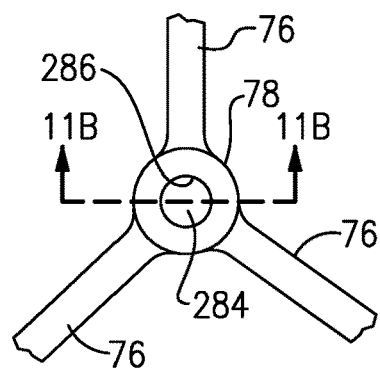
FIG. 11A illustrates a node that defines a node recess, a cover panel that conforms to the node recess, and a fastener that has a head that sits in the node recess.
Figure 11B:
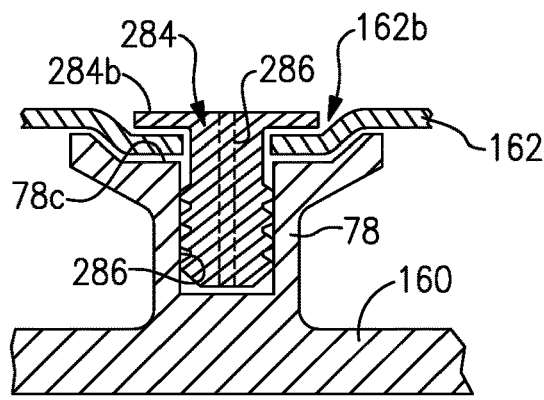
FIG. 11B is a sectioned view of FIG. 11A.

FIGS. 11A and 11B illustrate a modified example in which the node 78 defines a node recess 78c. In this example, the cover panel 162 conforms to the node recess 78c such that there is a dimple 162b in the cover panel 162. The head 284b of the fastener 284 is situated in the dimple 162b. This "low profile" configuration permits the head 284b to sit flush with, or below, the surface of the cover panel 162 immediately surrounding the dimple 162b, to enhance aerodynamics.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
    a body having rib nodes that define node cavities therein;
    a cover panel carried on the body over the rib nodes, the cover panel including:
        groups of flaps, each of the groups of flaps projecting into a corresponding one of the node cavities, and
        through-holes, each of the through-holes extending through the cover panel between the flaps of a respective one of the groups of flaps; and
    plugs disposed in the node cavities, each of the plugs pinching the flaps of a respective one of the groups of flaps against a respective one of the node cavities, locking the cover panel on the body, each of the plugs extending through a respective one of the through-holes to be in contact with the body.

2. The airfoil as recited in claim 1, wherein each of the plugs includes an exposed surface that is flush with the cover panel.

3. The airfoil as recited in claim 1, wherein each of the rib nodes includes an undercut.

4. The airfoil as recited in claim 1, wherein the cover panel is a fiber-reinforced polymer composite, and the body is metal.

5. The airfoil as recited in claim 1, wherein each of the node cavities is symmetric.

6. The airfoil as recited in claim 1, wherein each of the node cavities is round.

7. The airfoil as recited in claim 1, wherein the plugs are polymer-based.

8. The airfoil as recited in claim 1, wherein the plugs are fiber-reinforced polymer composite.

9. A gas turbine engine comprising:
a fan;
a compressor section;
a combustor in fluid communication with the compressor section; and
a turbine section in fluid communication with the combustor,
the fan having airfoils that each include
 a body having rib nodes that define node cavities therein,
 a cover panel carried on the body over the rib nodes, the cover panel including:
  groups of flaps, each of the groups of flaps projecting into a corresponding one of the node cavities, and
  through-holes, each of the through-holes extending through the cover panel between the flaps of a respective one of the groups of flaps, and
 plugs disposed in the node cavities, each of the plugs pinching the flaps of a respective one of the groups of flaps against a respective one of the node cavities, locking the cover panel on the body, each of the plugs extending through a respective one of the through-holes to be in contact with the body.

10. The gas turbine engine as recited in claim 9, wherein each of the plugs includes an exposed surface that is flush with the cover panel and each of the rib nodes includes an undercut.

11. An airfoil comprising:
a body having rib nodes that define a node cavity therein;
 a cover panel carried on the body over the rib nodes, the cover panel including an exterior side facing away from the body, an interior side facing toward the body, and tabs that project from the interior side into the node cavities; and
plugs disposed in the node cavities and pinching the tabs against the node cavities, locking the cover panel on the body, each of the plugs including an exposed surface at the exterior side that is flush with the exterior side of the cover panel.

12. The airfoil as recited in claim 11, wherein each of the tabs is a cantilevered flap.

13. The airfoil as recited in claim 11, wherein the tabs define there between through-holes from the exterior side to the interior side.

14. The airfoil as recited in claim 13, wherein the plugs extend through the through-holes to contact the body.

15. The airfoil as recited in claim 14, wherein the plugs are fiber-reinforced polymer composite.

16. The airfoil as recited in claim 11, wherein each of the node cavities is defined by a side wall and a bottom wall, and the tabs are in interfacial contact with the side wall and the bottom wall.

* * * * *